(12) United States Patent
Broe

(10) Patent No.: US 7,987,973 B2
(45) Date of Patent: Aug. 2, 2011

(54) PUSHING BELT

(75) Inventor: Peter Broe, Løsning (DK)

(73) Assignee: Ammeraal Beltech Modular A/S, Vejle (DK)

( * ) Notice: Subject to any disclaimer, the term of this patent is extended or adjusted under 35 U.S.C. 154(b) by 0 days.

(21) Appl. No.: 12/542,917

(22) Filed: Aug. 18, 2009

(65) Prior Publication Data

US 2010/0038215 A1    Feb. 18, 2010

(30) Foreign Application Priority Data

Aug. 18, 2008   (DK) ................................ 2008 01109

(51) Int. Cl.
    *B65G 17/06* (2006.01)
(52) U.S. Cl. ........................................ 198/850; 198/795
(58) Field of Classification Search .................. 198/795, 198/831, 850, 853
    See application file for complete search history.

(56) References Cited

U.S. PATENT DOCUMENTS

| | | | |
|---|---|---|---|
| 3,807,548 A * | 4/1974 | Bergeron ....................... | 198/850 |
| 4,105,111 A * | 8/1978 | Lapeyre ......................... | 198/850 |
| 4,832,183 A | 5/1989 | Lapeyre | |
| 5,307,923 A * | 5/1994 | Damkjaer ..................... | 198/852 |
| 5,339,938 A * | 8/1994 | Patin .............................. | 198/850 |
| 6,006,898 A * | 12/1999 | Odink ........................... | 198/853 |
| 6,761,264 B2 * | 7/2004 | Steeber et al. ............. | 198/844.1 |
| 7,360,643 B1 | 4/2008 | Fandella | |
| 7,367,448 B2 * | 5/2008 | Fandella ....................... | 198/853 |
| 2010/0038216 A1 | 2/2010 | Andersen | |

FOREIGN PATENT DOCUMENTS

| | | |
|---|---|---|
| EP | 0974537 | 1/2000 |
| FR | 2716180 | 8/1995 |

OTHER PUBLICATIONS

Search Report issued by the Danish Patent Office on Mar. 27, 2009, for priority Danish Application No. PA 2008 01109.

* cited by examiner

Primary Examiner — James R Bidwell
(74) Attorney, Agent, or Firm — Sheridan Ross, P.C.

(57) ABSTRACT

A conveyer belt, of the type used in endless conveyors, has a plurality of belt links. Each belt link is substantially identical, and has a front edge, a rear edge, two side edges, an upper surface, and an under surface between the edges. The front and rear edges relate to the direction of travel in use. The front edge of each belt link is provided with an indentation and the rear edge is provided with a mirror image of the indentation in the form of a recess. The front edge of one belt link snugly fits in the rear edge of an adjacent belt link.

12 Claims, 7 Drawing Sheets

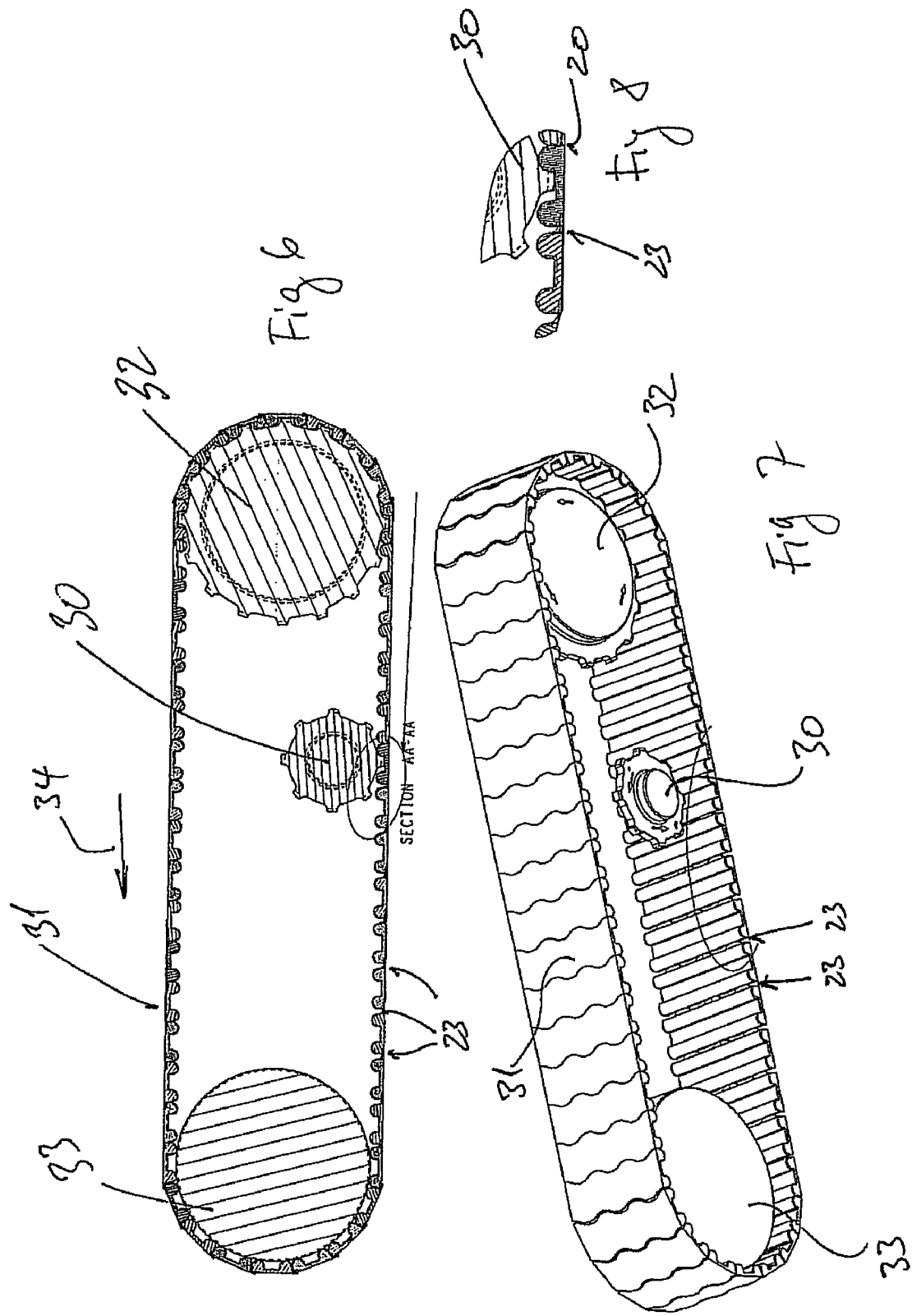

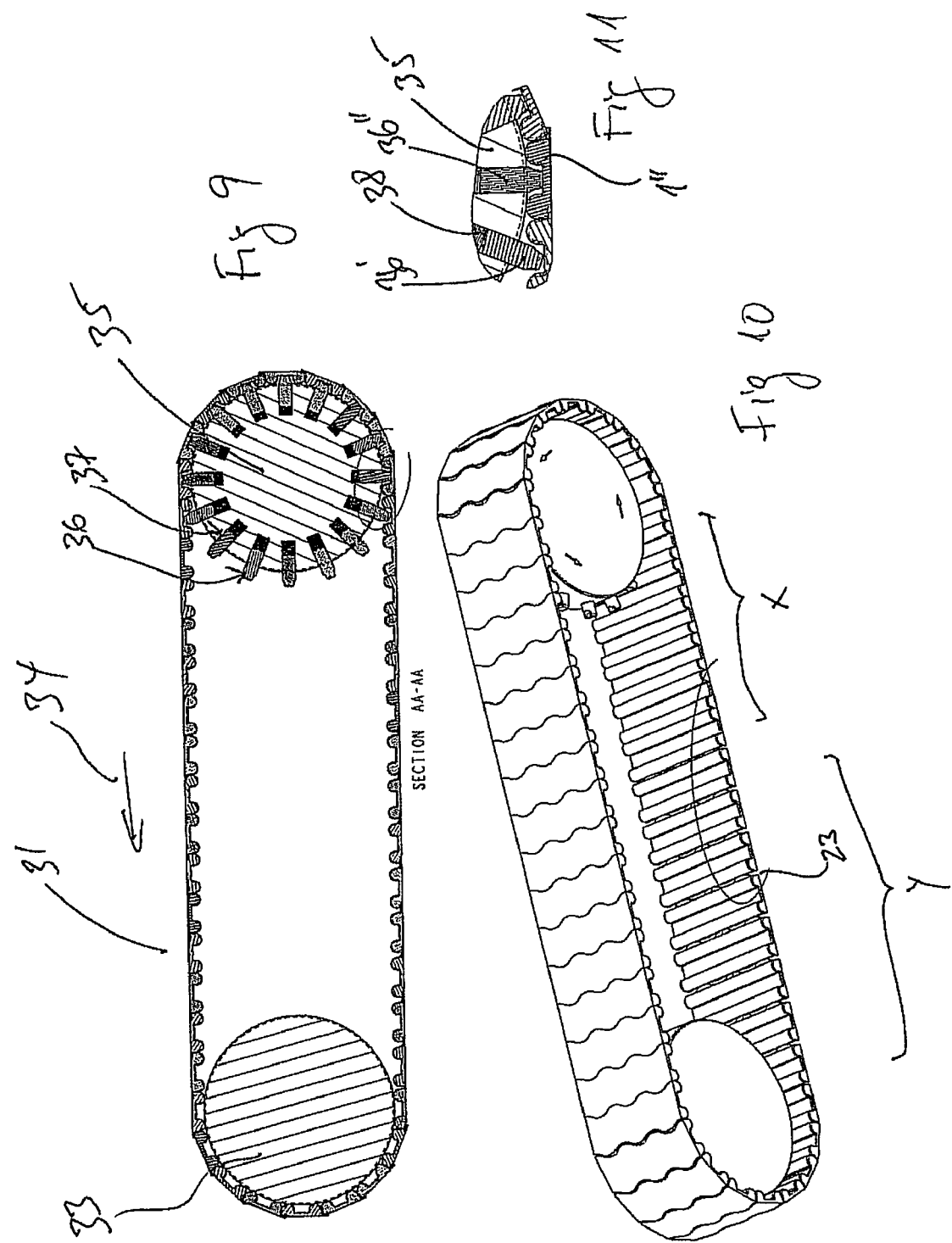

PUSHING BELT

CROSS REFERENCE TO RELATED APPLICATIONS

The present application claims the benefit of Denmark Application No. PA200801109 filed Aug. 18, 2008, the entire contents of which is incorporated herein by this reference.

FIELD OF THE INVENTION

The present invention relates to a conveyor belt of the type used in endless conveyors where said conveyor belt is made from a plurality of substantially identical belt links. Furthermore, the invention discloses a conveyor structure especially suited to incorporate a conveyor belt according to the invention.

BACKGROUND OF THE INVENTION

In the art there is a substantial amount of conveyor belts made from a plurality of substantially identical belt links, where each modular belt link is provided with means at leading and trailing edges for hingely and/or flexibly connecting two adjacent links such that a substantially continuous conveying surface is provided. The means for connecting adjacent links may for example be eye parts projecting from the leading or trailing edges where apertures are provided laterally in the eye parts such that eye parts of one modular belt link may be intermeshed with eye parts on an adjacent belt link whereby the apertures are superposed such that a connection pin just like a hinge may hingely connect to adjacent belt links.

In other embodiments the eye parts are provided with protrusions which extend laterally from the eye parts along one edge and along the opposite edge of the modular belt link the eye parts are provided with keyholes recesses which may accommodate the protrusions such that by inserting the protrusions on the eye parts of one modular belt link into the keyhole recesses. On an adjacent modular belt link a hinge like connection is created between two adjacent modular belt links.

In the art there are various variations of these types of connections and they all are well-proven and reliable, but also all possess a number of drawbacks which over the years have been sought addressed by various inventions by various modifications to the design of the eye parts, connecting pins etc.

A common drawback of these types of modular belt links is the fact that the laterally arranged apertures in the eye parts as well as the inserted pin create positions where it is very difficult to thoroughly clean the conveyor belt which especially for application in the food industry is very important. For these types of conveyor belts it is very difficult to maintain a high hygienic standard. In the art it is common to either at regular intervals dismantle the belt and soak it in cleaning solutions or stop the belt on the conveyor chassis for a period of time and soak it in cleaning liquids in-situ. These solutions naturally make it impossible to use the conveyor belt, while the cleaning process is carried out, and as such the profitability of the construction is not optimal.

Moreover, the cleaning process, although cleaning liquids are used that may effectively exterminate bacteria and the like, does not reliably remove all debris from the places that are difficult to reach, and although the hygienic standard bacteria-wise is achieved, the debris which has been hiding in the places that are difficult to reach may become dislodged and end up in the food product as pollution.

A further disadvantage with conveyor belts of this type is the fact that as a working surface the eye parts are not optimal, in that they provide an uneven surface to work on. Therefore, cutting action, for example during cutting up of animals, may not be carried out reliably. In the art this problem has been addressed by various special modular belt links where the upper surface is substantially continuous by providing a cover plate over the eye parts which in turn has resulted in narrow slits between adjacent modular belt links. These narrow slits have the disadvantage that knives or other thin objects may become lodged in the slit. This in itself is not a problem, as it is relatively easy to withdraw the object from the slit when the conveyor belt is stationary, but during production processes the conveyor belt is constantly moving and when the knife for example becomes stuck in a slit the angle between the knife's blade and the conveyor belt changes rapidly such that in most cases the tip of the knife will be broken off the knife with the risk that the tip ends up in the food products. For these purposes in a number of production lines magnetic sensors are installed on the finished product in order to detect magnetic debris from the production line.

OBJECT OF THE INVENTION

It is therefore an object of the present invention to provide a conveyor belt which addresses and overcomes some of the drawbacks mentioned above and furthermore provides advantages which are not available with the types of conveyor belts which are available in the art.

DESCRIPTION OF THE INVENTION

The invention addresses this by providing a conveyor belt of the type used in endless conveyors, where said conveyor belt is made from a plurality of belt links, where each belt link is substantially identical, where each belt link is defined by a front edge, a rear edge, two side edges, and an upper surface and an under surface between said edges, where front and rear relate to the direction of travel in use characterised in that the front edge of each belt link is provided with an indentation and the rear edge is provided with a mirror image of said indentation, such that the front edge of one belt link may snugly fit in the rear edge of an adjacent belt link.

As is evident from the description of the belt links making up the conveyor belt there are no eye parts or other intermeshing parts or pins where foreign debris may become lodged. The indentation and mirror image indentation ensures that as two adjacent belt links are pushed together the indentations will mutually keep two adjacent belt links in a position where they will follow each other such that the top surfaces will substantially remain in the same plane. Furthermore, as one belt link will snugly accommodate an adjacent belt link when the belt links are pushed together it is possible to design the interface between neighbouring belt links such that no slit will be present whereby a completely level and flush top surface is provided.

Contrary to other conveyor belts in the art, the inventive belt according to the invention is propelled by pushing the modular belt links forwards, whereas it is normal practice to pull the modular belt along its course.

In a further advantageous embodiment the under-surface of each belt link is provided with one or more substantially parallel rib(s) that project(s) away from the under-surface spanning at least partly or in intermittent sections from one side edge to the other side edge.

The ribs are mainly provided in order to provide each modular belt link with the strength necessary to span from one edge to the opposite side edge. The ribs provide stability and also create a firm surface for users to work on.

In a still further advantageous embodiment the front and rear edges have an upper part and a lower part, and where the lower part is provided with said indentation and said mirror image indentation respectively, where the lower part of the front and rear edges are parallel and are arranged perpendicular to the side edges, and where the upper part is not straight from side edge to side edge, and where the shape of the front edge's upper part is a mirror image of the shape of the rear edge's upper part seen in the plane of the upper surface, such that sections of the upper parts may extend in the plane of the upper surface beyond the front and rear edges, and where corresponding recesses are provided in the upper part along the opposite edge.

Be dividing the front and rear edges into two parts perpendicular to the surface it becomes possible to divide the function of the front and rear edges such that the lower part of the front and rear edges are dedicated to engagement and propulsion of the modular belt links whereas the upper part is dedicated to providing a flush and even top surface for the conveyor belt as such.

Furthermore, in the embodiments where the belt links are provided with ribs, and in particular where the ribs are placed immediately adjacent the front and rear edges thereby forming part of the front and rear edges as disclosed in a further advantageous embodiment of the invention, it becomes possible to provide a substantial area for the mutual engagement between two adjacent lengths such that forces may be distributed over a large area, such that the force per unit is greatly reduced whereby the conveyor belt's over all loading capability is greatly increased.

As the upper part of the front and rear edges are not concerned with load carrying or transferring of propulsion forces, but solely dedicated to providing a flat, homogenous and flush top surface, it is also possible to design part of the front edge such that it will extend and have a free portion extending beyond the front edge on one modular belt link and by providing a corresponding recess, i.e. a section of the upper part on an adjacent belt link where the upper part has been removed in order to accommodate the extension, the upper surface in the connection area between two adjacent modular belt links need not be immediately superposed the front or rear edges of the modular belt link.

In a still further advantageous embodiment the upper part of the front and rear edge has a wave shape, a zigzag shape or any undulating or non-linear shape. In this manner the problems as already mentioned above with having a straight line/gap across the belt width in which an object such that the tip of a knife can become stuck and break off are avoided.

By cutting on top of a belt having a wave pattern in the intersection between two adjacent modular belt links the likelihood of a knife entering the slit is greatly reduced.

In a still further embodiment of the invention one or more pins project parallel to the upper surface away from each side edge. In this manner it becomes possible to guide the modular belt links in guide means provided in the conveyor chassis structure, such that even under heavy loads buckling and the like in the conveyor belt may be avoided. Under normal circumstances it is enough to support the modular belt links making up the conveyor belt against vertical loads, for example by providing rails underneath the modular belt links and sideways such that they will not be displaced relative to each other.

In a still further advantageous embodiment two adjacent belt links are provided with flexible connection means connecting said belt links, where said flexible connection means are attached to the under surface of each belt link, where the length of the flexible connection means is longer than the distance between the attachment points on the adjacent belt links when their respective front and rear edges are in contact.

As the conveyor belt and the belt links making up the conveyor belt are designed to be pushed along the conveying part which is contrary to other conveyor belts made out of substantially identical belt links as discussed above which are pulled along the return run of the conveyor belt, i.e. when they are not having their top surface facing upwards would also have to be pushed forward such that no distance would become available between adjacent belt links. However, by arranging flexible connections between adjacent modular belt links which flexible connections are longer than the distance between the connection points in respective modular belt links it becomes possible to pull the belt links along the return run, whereby openings between each and every modular belt link become available for e.g. cleaning purposes.

Furthermore, as the connection between two modular belt links is relatively even, i.e. no nooks and crannies, apertures, pins or the like, it is relatively easy and fast with a high degree of security to thoroughly clean and maintain the hygienic standard of the belt links as the accessibility to the space between two modular belt links is easily and conveniently provided as the two adjacent belt links are completely separated. The flexible connection means ensures that the integrity of the conveyor belt is maintained.

In a still further advantageous embodiment the flexible attachment means are described as being attached in various positions to the underside of the modular belt links. The skilled person having realized the advantages achievable by having a construction incorporating flexible connection means will according to the circumstances attach the connection means in the most appropriate position on the underside of the modular belt links.

The invention is also directed to a conveyor structure comprising a chassis, drive means and an endless conveyor belt arranged around cylinders provided in each end of the chassis, such that the conveyor belt arranged around and between the cylinders will have an upper run during which the upper surface of the belt links will be facing upwards, and a return run, where the upper surface will be facing downwards, and where the conveyor belt due to the action of the drive means may rotate endlessly characterised in that the conveyor belt is according to any of claims 1 to 8.

In further advantageous embodiments of the conveyor structure as set out in the depending claims various means are provided for pushing the modular belt links along the conveying part as well as separating the modular belt links along the return run in order to provide the openings for, for example cleaning or other tasks. Especially a sprocket wheel with biased sprockets which is pulling the return run and at the same time pushing the forward run is a simple construction in that the biasing of each tooth on the sprocket wheel will make the separate modular belt links "catch up" due to the biasing of the teeth on the sprocket wheel during the engagement with said sprocket wheel.

Also, the more simple construction of providing a pusher wheel on the return run which will be provided with a gear mechanism such that it will rotate slightly faster than the regular sprocket wheels driving the endless conveyor belt whereby the gap between two adjacent modular belt links after having passed the pusher wheel will diminish and at the same time the pusher wheel will pull along the modular belt links along the return run.

BRIEF DESCRIPTION OF THE DRAWING

The invention will now be explained with reference to the accompanying drawings wherein

FIG. 6 to 11 illustrate two different embodiments of how a conveyor belt structure incorporating modular belt links according to the invention may be propelled

DETAILED DESCRIPTION OF AN EMBODIMENT

Figure 1:
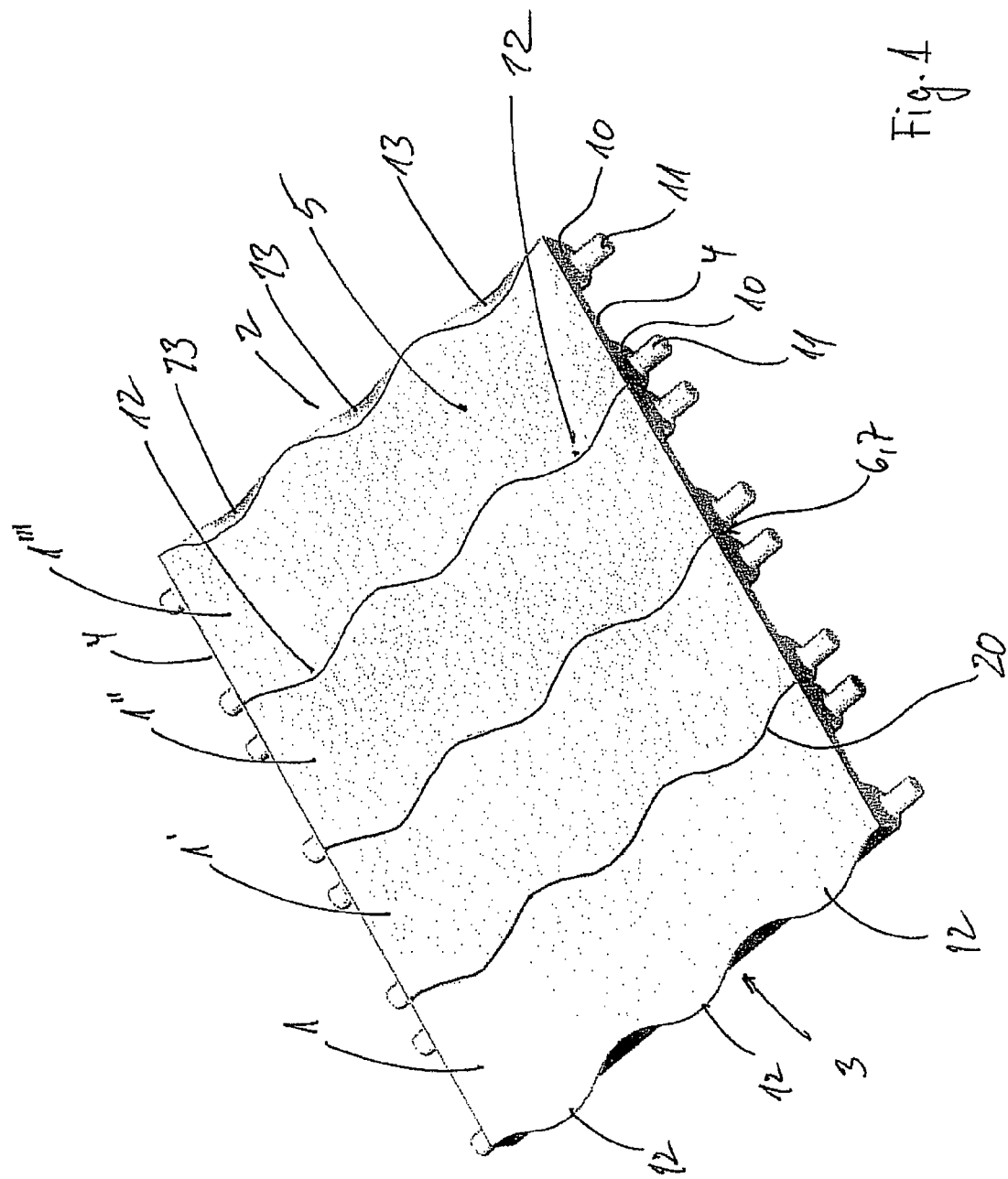
FIG. 1 illustrates a section of a conveyor belt according to the invention.
Figure 2:
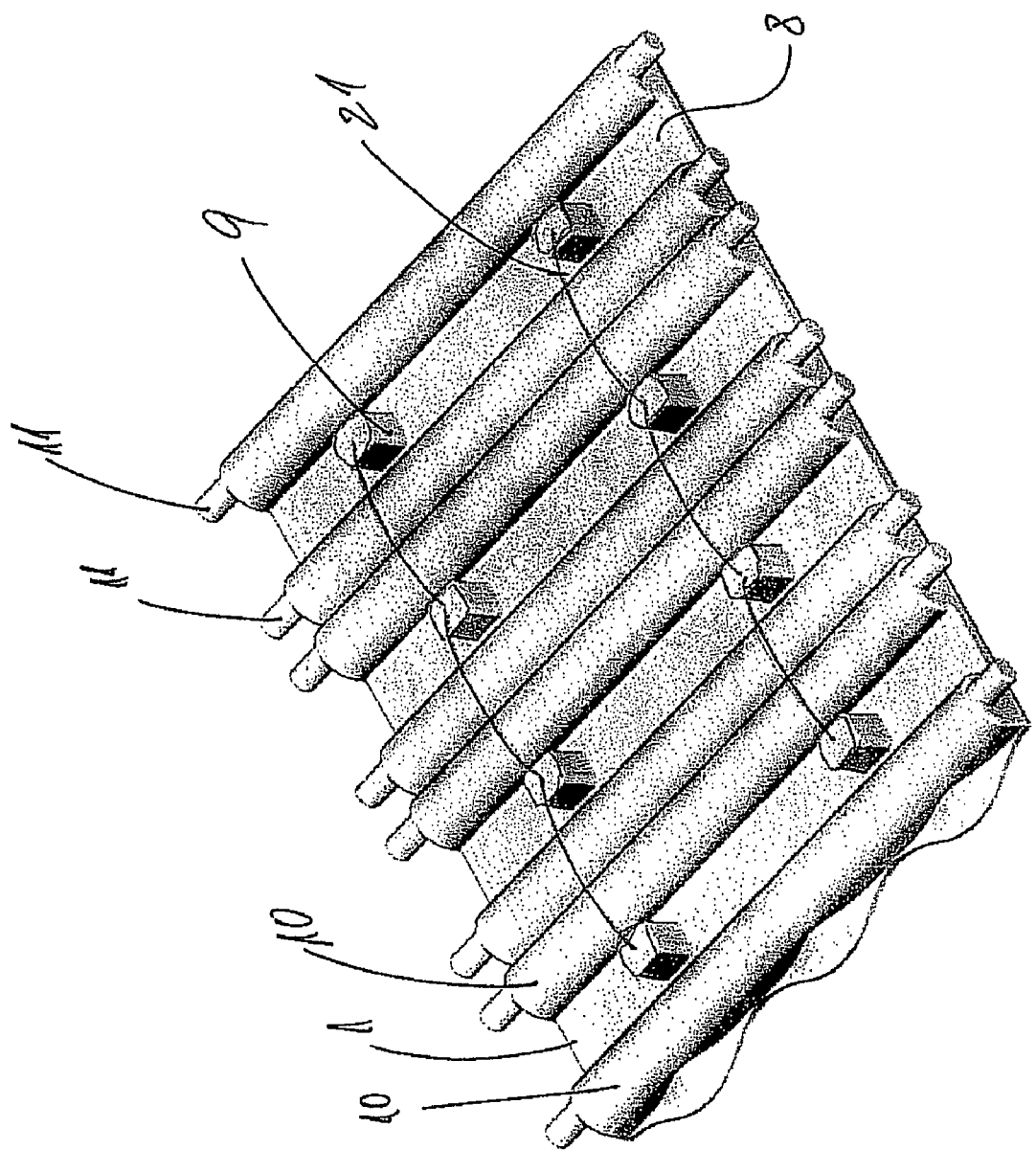
FIG. 2 illustrates the underside of the section of the belt from FIG. 1.

In FIG. 1 is illustrated a section of a conveyor belt according to the invention where this particular section comprises 4 modular belt links 1, 1', 1", 1'". Each modular belt link 1 is provided with a front edge 2 and a rear edge 3. In addition, side edges 4 are provided such that the modular belt link between the front and rear edges 2, 3 and the side edges 4 has an upper surface 5. In this particular embodiment the underside as will be evident from FIG. 2 is provided with ribs 10, one along each front and rear edge 2,3 in order to provide extra strength to the belt module. The side edges 4 are furthermore provided with protrusions 11 extending away from the side edge such that these protrusions may interact with guiding means provided in a conveyor chassis (not illustrated) in order to provide stable conveying conditions for the entire conveyor structure.

A core principle and very important feature with the present invention is the fact that the conveyor modules 1 are pushed together and along the conveying path such that between the modules as such there is not physical connection.

The top surface 5 constitutes the upper part of the front respectively rear edges 2, 3 and in this embodiment the ribs constitute the lower part of the front and rear edges 2, 3. The lower parts are designed with indentations and mirror image indentations 6, 7 which fit snugly together in order to provide a stable load transfer from one modular belt link to an adjacent modular belt link.

The upper section is provided with extensions 12 which project outside the modular belt link relative to the front and rear edges respectively 2, 3 of the modular belt link 1. Opposite the projections 12 are provided recesses which are mirror images of the projections 12 such that when the modules 1, 1', 1", 1'" are pushed together during normal operation the dividing line 20 between two adjacent modular belt links will appear as a wave-like curve 20. In this position the projections 12 will be supported by the recesses 13 such that the entire top surface of each modular belt link and thereby the conveyor belt as such is firm and stable and provides a reliable working surface. The wave pattern 20 could also by designing the projections 12 and the recesses 13 differently be in the shape of a zigzag or other undulating non-linear dividing line 20. By providing a non-linear dividing line the risk of workers on the belt getting items such as knives and the like stuck in the dividing line between 2 adjacent belt links.

Turning to FIG. 2 illustrating the section of the belt from FIG. 1 but the underside, it is clear to see that the belt links 1 are closely pushed together. Furthermore, the ribs 10, extend from side edge to side edge in order to provide the strength of each modular belt link. Between the ribs 10 is a flat undersurface 8. In this embodiment connection towers 9 are provided as upstanding projections from the flat under-surface 8 such that flexible connection means 21 arranged between the connection towers 9 on adjacent belt links 1 ensures that as the belt links are being pulled on the return run in the conveyor structure adjacent links will be separated at a distance corresponding to the length of the connection means 21 as attached to the connection towers 9. The connection means 21 may for example be in the shape of a thin wire, for example made from nylon, steel, carbon or the like. The requirement to the connection means 21 is that they shall be suitable to transfer the loads by means of tensioning as the conveyor belt is being pulled along the return run. Furthermore, it shall be possible to effectively fasten the connection means 21 to the connection towers 9.

In this particular embodiment the connection towers are provided in order to provide fastening for the connection means 21, but the connection means 21 may also be imbedded or otherwise fastened to the ribs 10 and consequently the length of the connection means 21 shall be the dimensioned accordingly.

It is essential for the invention in embodiments where a thorough cleaning is desirable that the length of the connection means 21 is dimensioned such that gaps 22 as will be explained with reference to FIG. 3 will occur as the conveyor belt is being pulled along the return run.

Figure 3:
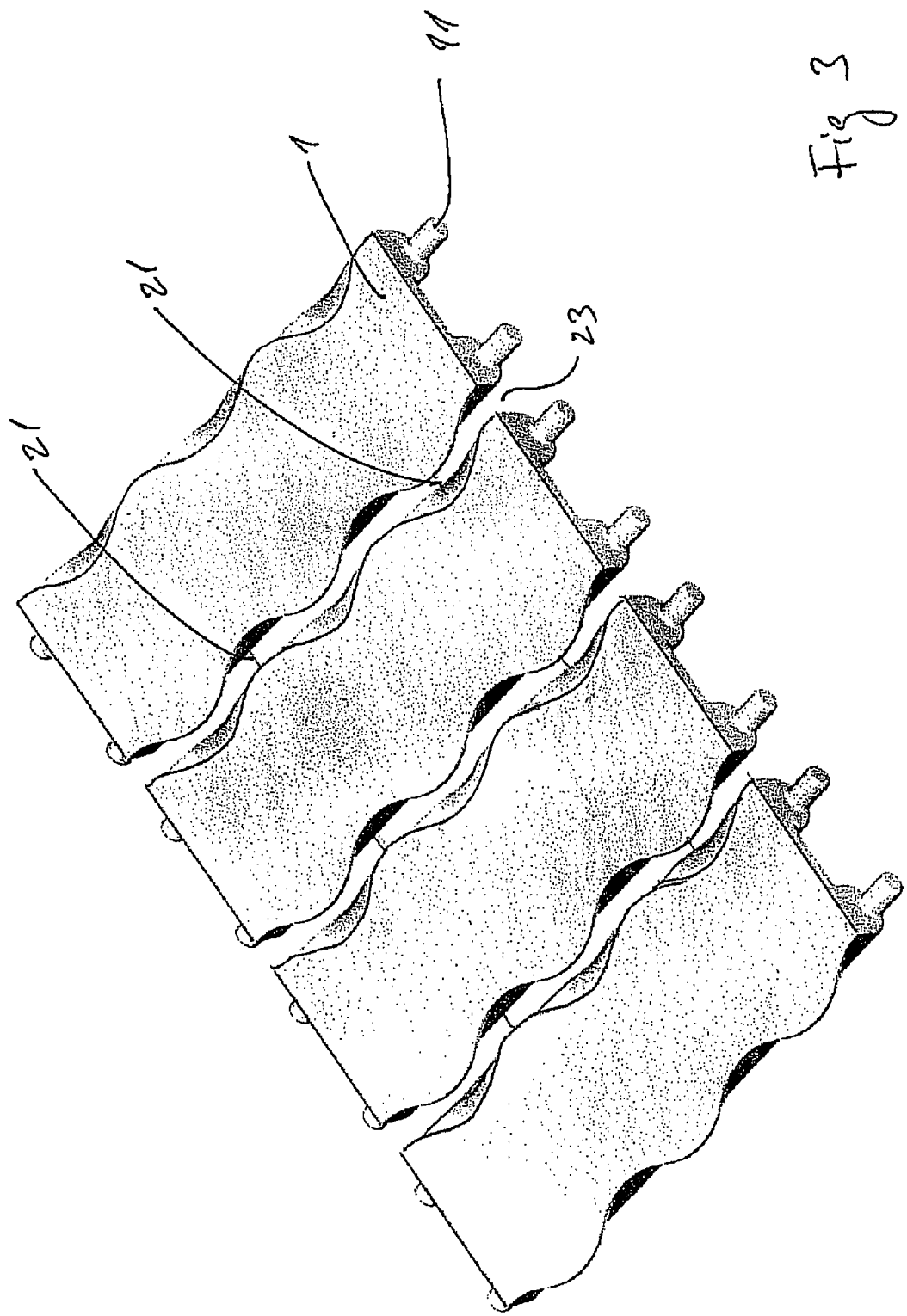
FIG. 3 illustrates a section of a conveyor belt according to the invention where the modules are pulled apart.

Turning to FIG. 3 the belt links 1 have been pulled apart whereby gaps 23 have been created. In the gaps 23 the connecting means arranged on the belt link's underside are exposed.

Figure 4:
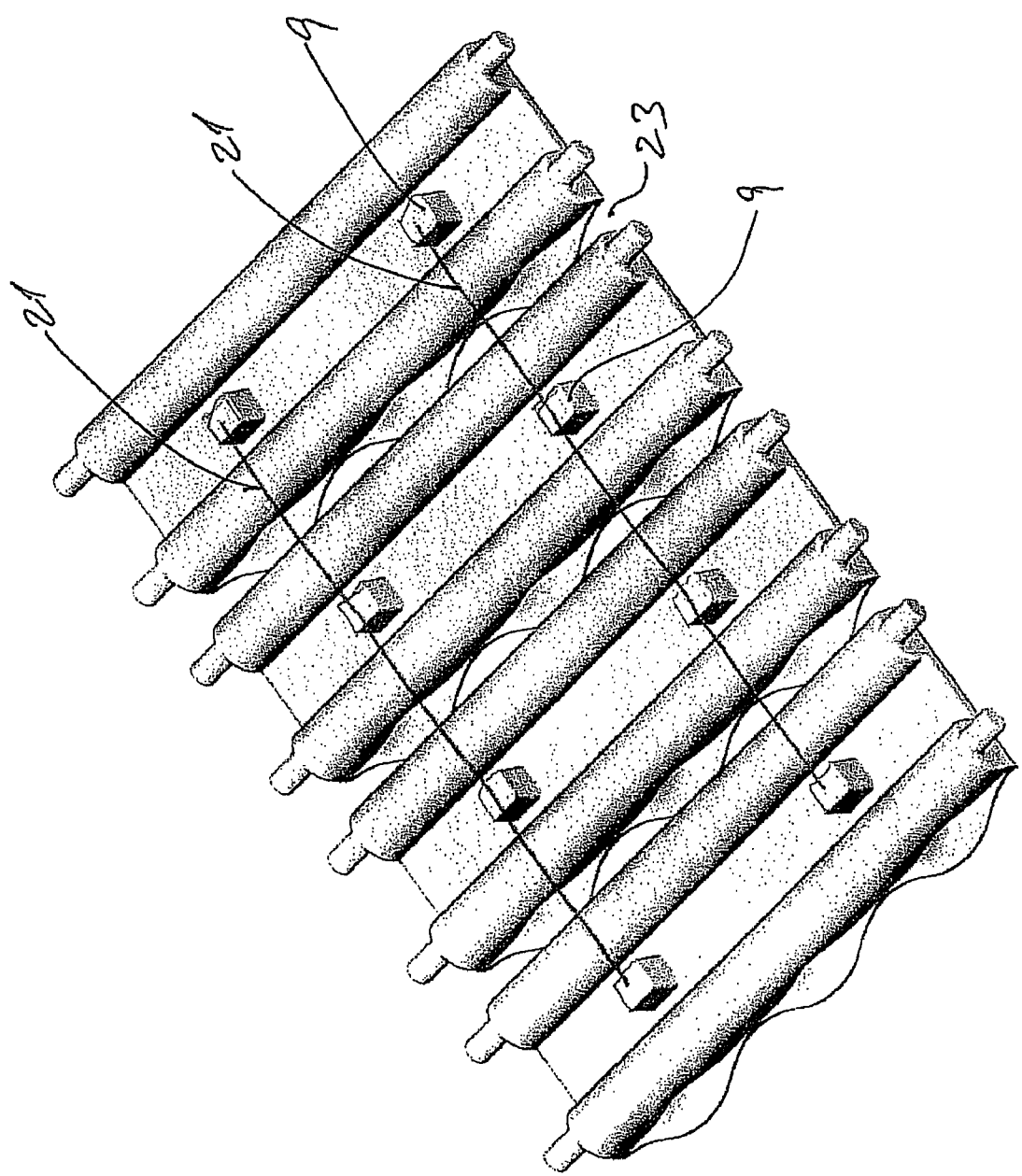
FIG. 4 illustrates a section of a conveyor belt's underside according to the invention where the modules are pulled apart.

Turning to FIG. 4 the illustrative embodiment of FIG. 3 is seen from below and it may be deducted that the connection means 21 now are fully stretched between the connection towers 9 whereby the length of the connection means defines the size of the gap 23.

As may be deducted from FIGS. 3 and 4 it is relatively easy to clean between the independent modular belt links making up the conveyor belt in that the surfaces are easily accessible and furthermore that the surfaces do not have any nooks or crannies, cavities, apertures and the like, in which foreign matter or bacteria would not be removed during a cleaning cycle.

Figure 5:
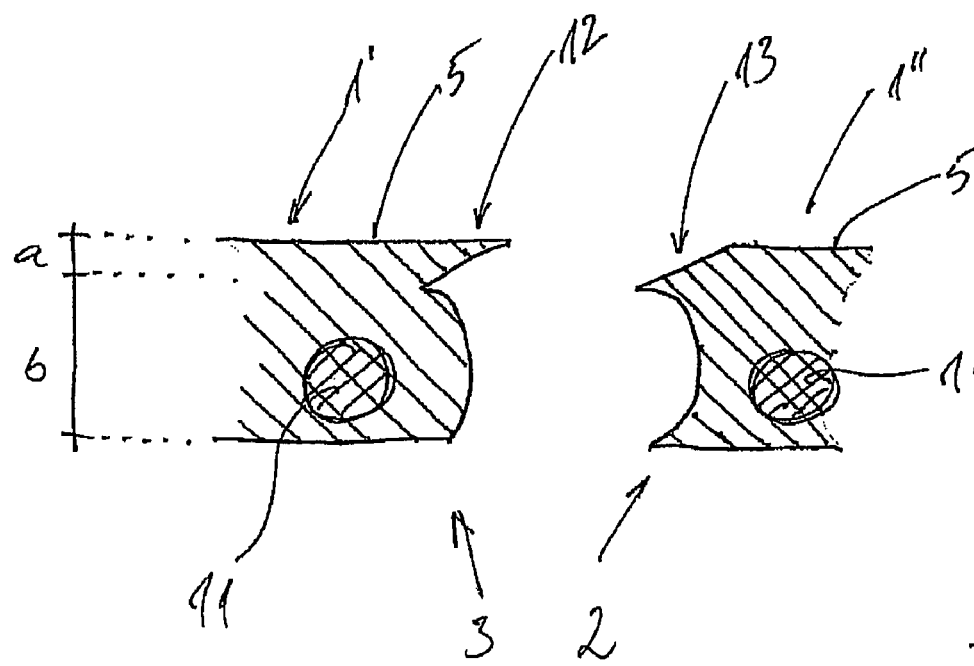
FIG. 5 illustrates a detailed view of the front and rear edges.

Turning to FIG. 5 a detailed view of the front and rear edges 2, 3 of two adjacent belt links is illustrated. As may be deducted from the illustration the front and rear edges 2, 3 are separated into an upper part A and a lower part B.

The upper part comprises the top surface 5 and the projection 12 or the accommodating recess 13 such that as the modular belt links 1', 1" are pushed together, the projection 12 will closely fit into the recess 13 such that the top surface 5 will be substantially flush and with only a very narrow separating line 20 (see FIG. 1) indicating the limits of the two adjacent belt links 1', 1".

In the lower part B of the front and rear edges 2, 3 respectively of the modular belt links 1', 1", the modular belt links are in this embodiment provided with a curved structure on one edge 3 being convex and on the other side being concave such that as the two belt links 1', 1" are pushed together the curvatures which are mirror images of each other will snugly fit together whereby substantially no open space is provided between two adjacent belt links whereby the forces propelling the assembled conveyor belt will be transferred substantially over the entire width of the belt link due to the snugly fit of the two adjacent modular belt links.

In FIG. 6-11 is illustrated two different embodiments of how a conveyor belt structure incorporating modular belt links according to the invention may be propelled. In FIG. 6-8 a system including a pusher wheel 30 is illustrated. The conveyor belt 31 made up from a plurality of individual modular belt links as explained with reference to FIG. 1-5 is arranged around a sprocket wheel 32 and a rotating cylinder such that the sprocket wheel 32 will propel the endless conveyor belt 31 in the direction indicated by the arrow 34. The pusher wheel 30 will rotate slightly faster than the sprocket wheel such that the gaps 23 present between the individual modular belt links along the return run will be closed due to the pushing action of the pushing wheel on the part of the upper run between the pushing wheel 30 and the sprocket wheel 32. FIG. 7-8 further illustrate this principle.

Turning to an alternative embodiment illustrated in FIG. 9-11 the endless conveyor belt 31 is arranged for rotation around a cylinder 33 and a sprocket wheel 35 for rotation of the endless conveyor belt 31 in the direction indicated by the arrow 34.

The sprocket wheel 35 is special in that the teeth 36 of the sprocket wheel are biased such that the teeth along with the biasing means for example in the shape of a helical spring are arranged in cylindrical apertures 37 provided radially along the periphery of the sprocket wheel 35.

As the sprocket wheel 35 engages the modular belt links 1, see for example detail in FIG. 11, the biasing means 38 will extend the sprocket tooth 36' to its most exposed extent until it engages a modular belt link where as illustrated by the engagement of the sprocket tooth 36" which is in engagement with the modular belt link 1" whereby the helical spring is compressed. The compression and the spring force the modular belt links into mutual engagement such that the gaps 23 will be closed by this action. The breaking action caused by the helical spring 38 transferred by the teeth 36', 36" causes the modular belt links immediately preceding the sprocket wheel, for example as indicated by the zone X, to have a slower speed than the individual belt links in the zone Y such that the gaps will be closed.

Due to the tension in the belt the teeth 36 will stay substantially compressed as the sprocket wheel rotates, and the pushing force of the modular belt link will be enforced as the modular belt link leaves the sprocket wheel due to the fact that the helical spring because of less pressure from the modular belt will expand thereby pushing the belt forward.

Although the invention has been described with reference to specific embodiments above, the scope of the invention shall only be limited by the appended claims.

The invention claimed is:

1. A conveyor belt, of the type used in endless conveyors, where said conveyor belt is made from a plurality of belt links, where each belt link is defined by a front edge, a rear edge, two side edges, an upper surface, and an under surface between said edges, where front and rear relate to the direction of travel in use wherein the front edge of each belt link is provided with an indentation and the rear edge is provided with a mirror image of said indentation, such that the front edge of one belt link snugly fits in the rear edge of an adjacent belt link, and wherein forces are transferred from the front edge to the rear edge of adjacent belt links by a driven sprocket wheel, in order to propel the conveyor belt.

2. The conveyor belt according to claim 1, wherein on the under surface of each belt link one or more substantially parallel rib(s) project(s) away from the under surface spanning at least partly or in intermittent sections from one side edge to the other side edge.

3. The conveyor belt according to claim 1, wherein the front and rear edges have an upper part and a lower part, and where the lower part is provided with said indentation and said mirror image indentation respectively, where the lower part of the front and rear edges are parallel and are arranged perpendicular to the side edges, and where the upper part is not straight from side edge to side edge, and where the shape of the front edge's upper part is a mirror image of the shape of the rear edge's upper part seen in the plane of the upper surface, such that sections of the upper parts may extend in the plane of the upper surface beyond the front and rear edges, and where corresponding recesses are provided in the upper part along the opposite edge.

4. The conveyor belt according to claim 3, wherein the upper part of the front and rear edges has a wave shape, a zigzag shape or any undulating or non-linear shape.

5. The conveyor belt according to claim 1, wherein one or more pins project parallel to the upper surface away from each side edge.

6. The conveyor belt according to claim 1, wherein two adjacent belt links are provided with flexible connection means connecting said belt links, where said flexible connection means are attached to the under surface of each belt link, where the length of the flexible connection means is longer than the distance between the attachment points on the adjacent belt links when their respective front and rear edges are in contact.

7. The conveyor belt according to claim 2, wherein two ribs are provided, where each rib is arranged adjacent front and rear edges respectively.

8. The conveyor belt according to claim 6, wherein the flexible attachment means are attached to the ribs, or separate attachment points are provided on the under surface or attachment towers project from the under surface onto which the flexible attachment means are fastened.

9. The conveyor structure, comprising a chassis, drive means and an endless conveyor belt arranged around cylinders provided in each end of the chassis, such that the conveyor belt arranged around and between the cylinders will have an upper run during which the upper surface of the belt links will be facing upwards, and a return run, where the upper surface will be facing downwards, and where the conveyor belt due to the action of the drive means may rotate endlessly characterised in that the conveyor belt is according to claim 1.

10. The conveyor structure according to claim 9, wherein the cylinder in one end is in the shape of a sprocket wheel, where sprockets are provided for engagement with the ribs provided on the underside of the belt links, and where said sprocket wheel pushes the belt links forwards along the upper run.

11. The conveyor structure according to claim 10, wherein the sprocket wheel is provided with sprockets radially moveable relative to the centre of the wheel, where the sprockets are outwardly biased.

12. The conveyor structure according to claim 10, wherein a secondary pusher sprocket wheel is arranged adjacent the pushing sprocket wheel, where said secondary pusher sprocket wheel rotates faster than the sprocket wheel and where the distance along the periphery of the secondary sprocket wheel between two adjacent sprockets is larger than the distance between the corresponding sprockets on the sprocket wheel, such that the front and rear edges of adjacent belt links are brought into contact due to the action of the secondary sprocket wheel.

* * * * *